US012671167B2

(12) United States Patent
Ono

(10) Patent No.: US 12,671,167 B2
(45) Date of Patent: Jun. 30, 2026

(54) PNEUMATIC TIRE

(71) Applicant: BRIDGESTONE CORPORATION, Tokyo (JP)

(72) Inventor: Takatoshi Ono, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 38 days.

(21) Appl. No.: 18/872,966

(22) PCT Filed: Aug. 10, 2023

(86) PCT No.: PCT/JP2023/029353
§ 371 (c)(1),
(2) Date: Dec. 9, 2024

(87) PCT Pub. No.: WO2024/053338
PCT Pub. Date: Mar. 14, 2024

(65) Prior Publication Data
US 2025/0316886 A1 Oct. 9, 2025

(30) Foreign Application Priority Data

Sep. 5, 2022 (JP) ................................. 2022-141054

(51) Int. Cl.
*H01Q 1/22* (2006.01)
*B60C 19/00* (2006.01)
(Continued)

(52) U.S. Cl.
CPC ........... *H01Q 1/2241* (2013.01); *B60C 19/00* (2013.01); *G06K 19/07764* (2013.01);
(Continued)

(58) Field of Classification Search
CPC ........ H01Q 1/2241; H01Q 1/38; H01Q 23/00; B60C 19/00; B60C 13/00; B60C 15/0009; G06K 19/07764; G06K 19/07773
See application file for complete search history.

(56) References Cited

U.S. PATENT DOCUMENTS 7,619,576 B2 * 11/2009 Beckley .............. B60C 23/0433
343/873
2004/0021558 A1 2/2004 Kelly et al.
(Continued)

FOREIGN PATENT DOCUMENTS

JP 2005508784 A 4/2005
JP 2005534552 A 11/2005
(Continued)

OTHER PUBLICATIONS

Nov. 14, 2023, International Search Report issued in the International Patent Application No. PCT/JP2023/029353.
(Continued)

*Primary Examiner* — John A Tweel, Jr.
(74) *Attorney, Agent, or Firm* — KENJA IP LAW PC

(57) ABSTRACT

A pneumatic tire including: a tire body; and a communication device embedded in the tire body or attached to an inner surface of the tire body. The communication device includes a flat antenna, and the communication device is disposed so that an antenna in-plane direction that is perpendicular to the thickness direction of the flat antenna is along an outer surface of the tire body.

6 Claims, 10 Drawing Sheets

(51) Int. Cl.

| | |
|---|---|
| *G06K 19/077* | (2006.01) |
| *H01Q 1/38* | (2006.01) |
| *H01Q 23/00* | (2006.01) |
| *B60C 13/00* | (2006.01) |
| *B60C 15/00* | (2006.01) |

(52) U.S. Cl.

CPC ......... *G06K 19/07773* (2013.01); *H01Q 1/38* (2013.01); *H01Q 23/00* (2013.01); *B60C 13/00* (2013.01); *B60C 15/0009* (2013.01)

(56) References Cited

U.S. PATENT DOCUMENTS

| | | |
|---|---|---|
| 2004/0021559 A1 | 2/2004 | O'Brien |
| 2004/0263416 A1 | 12/2004 | Beckley et al. |
| 2017/0225524 A1 | 8/2017 | Tamura |
| 2021/0271951 A1 | 9/2021 | Moon et al. |

FOREIGN PATENT DOCUMENTS

| | | |
|---|---|---|
| JP | 2010269670 A | 12/2010 |
| JP | 2015223918 A | 12/2015 |
| JP | 2016037235 A | 3/2016 |
| JP | 2021127094 A | 9/2021 |
| JP | 2022084145 A | 6/2022 |
| WO | 03041974 A1 | 5/2003 |
| WO | 2004011285 A1 | 2/2004 |
| WO | 2020004797 A1 | 1/2020 |

OTHER PUBLICATIONS

Mar. 1, 2025, International Preliminary Report on Patentability issued in the International Patent Application No. PCT/JP2023/029353.

Dec. 2, 2025, search result of the Extended European Search Report issued by the European Patent Office in the corresponding European Patent Application No. 23862878.8.

* cited by examiner

PNEUMATIC TIRE

TECHNICAL FIELD

The present disclosure relates to a pneumatic tire.

BACKGROUND

Conventionally, pneumatic tires are known that include a communication device such as a radio frequency (RF) tag including a memory and the like for reading and writing data for tire production management, shipping management, use history management, and the like (for example, see Patent Literature (PTL) 1). As such a communication device, a configuration has been proposed that includes a flattened-shape antenna having a portion in which a defined shape is arranged in a repeating pattern (for example, see PTL 2).

CITATION LIST

Patent Literature

PTL 1: JP 2016-037235 A
PTL 2: JP 2022-084145 A

SUMMARY

Technical Problem

When a communication device including the flattened-shape antenna (hereinafter also referred to as the "flat antenna") described in PTL 2 is applied to a pneumatic tire, communication performance of the flat antenna may vary depending on the positional orientation of the communication device.

It would be helpful to provide a pneumatic tire capable of improving the communication performance of a communication device including a flat antenna.

Solution to Problem

A pneumatic tire as a first aspect of the present disclosure is
(1)
a pneumatic tire comprising:
a tire body; and
a communication device embedded in the tire body or attached to an inner surface of the tire body, wherein
the communication device comprises a flat antenna, and
the communication device is disposed so that an antenna in-plane direction that is perpendicular to the thickness direction of the flat antenna is along an outer surface of the tire body.
A pneumatic tire as an embodiment of the present disclosure is
(2)
the pneumatic tire according to (1), above, wherein
the communication device further comprises:
a substrate including an IC chip; and
an outer body configured to hold the flat antenna and the substrate on a holding surface, wherein
the communication device is disposed so that the holding surface of the outer body faces the side of the outer surface of the tire body.

A pneumatic tire as an embodiment of the present disclosure is
(3)
the pneumatic tire according to (1), above, wherein
the communication device further comprises:
a substrate including an IC chip; and
an outer body configured to hold the flat antenna and the substrate on a holding surface, wherein
the communication device is disposed so that a surface of an opposite side to the holding surface of the outer body faces the side of the outer surface of the tire body.
A pneumatic tire as an embodiment of the present disclosure is
(4)
the pneumatic tire according to any one of (1) to (3), above, wherein the flat antenna is a flat wire antenna, extending in a meandering, wavy-shaped, or zigzag-shape along the antenna in-plane direction.
A pneumatic tire as an embodiment of the present disclosure is
(5)
the pneumatic tire according to (4), above, wherein
the communication device is embedded in a sidewall portion of the tire body in one direction along the tire radial direction relative to a turn-up end of a carcass, and
a tip of the flat wire antenna is not disposed at a position corresponding to an end of the flat wire antenna in the other direction along the tire radial direction.
A pneumatic tire as an embodiment of the present disclosure is
(6)
the pneumatic tire according to (5), above, wherein the tip of the flat wire antenna terminates facing the one direction along the tire radial direction.
According to the present disclosure, it is possible to provide a pneumatic tire capable of improving the communication performance of a communication device including a flat antenna.

BRIEF DESCRIPTION OF THE DRAWINGS

In the accompanying drawings.

DETAILED DESCRIPTION

The following describes an example of an embodiment of the pneumatic tire according to the present disclosure, with reference to the drawings. In each drawing, the same structure is indicated by the same reference sign.

Figure 1:
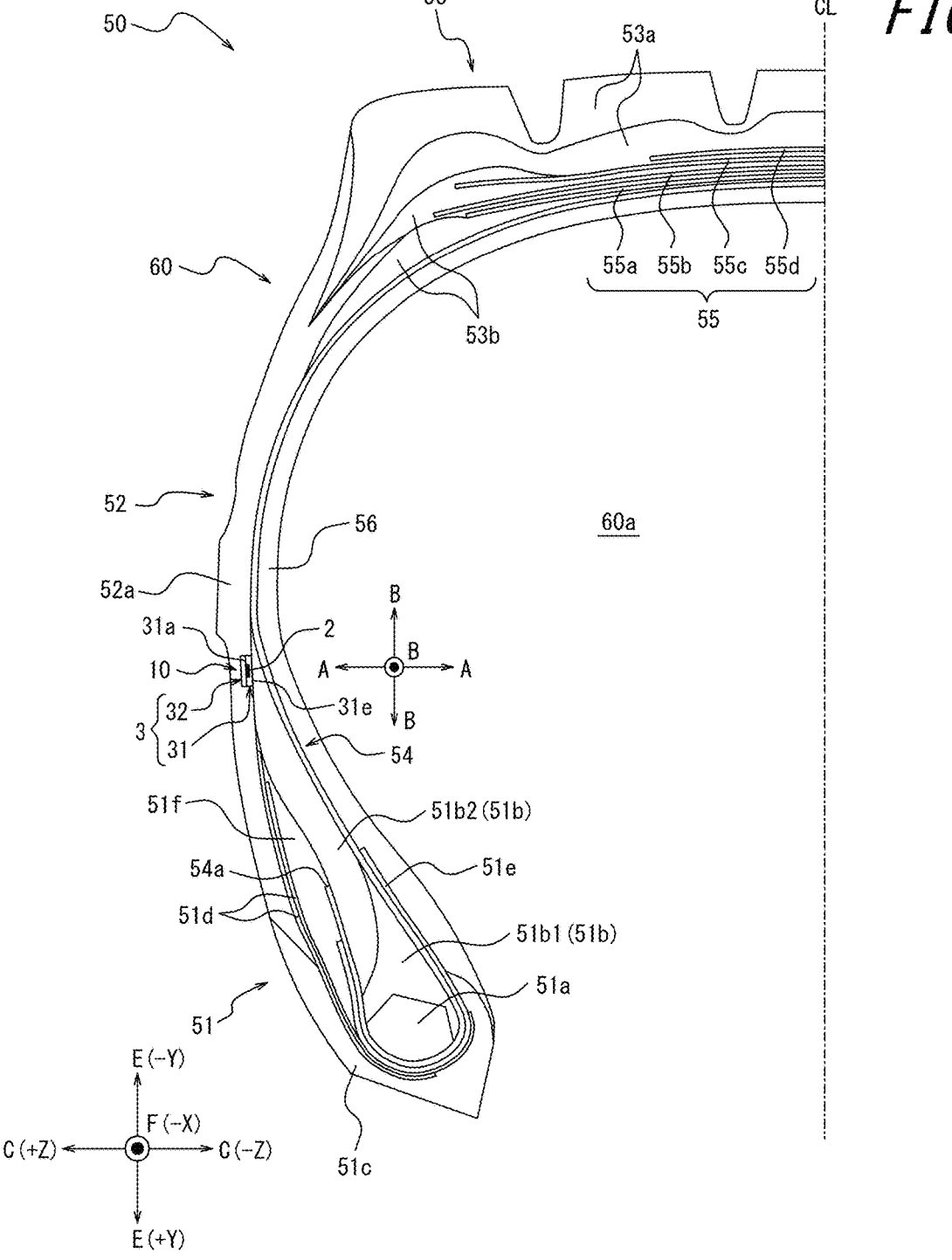
FIG. 1 is a tire width direction cross-section diagram of a pneumatic tire as an embodiment of the present disclosure.

FIG. 1 is a tire width direction cross-section diagram of a pneumatic tire 50 as an embodiment of the pneumatic tire according to the present disclosure. As illustrated in FIG. 1, the pneumatic tire 50 includes a tire body 60 and a communication device 10. Hereinafter, for convenience of description, the pneumatic tire 50 is also referred to simply as "tire 50".

FIG. 1 illustrates only one half portion in the tire width direction C bounded by the tire equatorial plane CL of the tire 50, but the same structure is used for the other half portion, except for presence/absence of the communication device 10. However, the tire 50 may include asymmetric portions with the tire equatorial plane CL as a boundary.

The tire 50 illustrated in FIG. 1 is a tire for a truck or bus, but the tire 50 may be another heavy-duty tire or a tire for a passenger vehicle.

[Tire Body 60]

The internal structure of the tire body 60 is not particularly limited. The following configuration is an example. The tire body 60 includes a pair of bead portions 51, a pair of sidewall portions 52 connected to the bead portions 51, and a tread portion 53 connected to the sidewall portions 52. In each of the bead portions 51, a bead core 51a is embedded, and a stiffener 51b is disposed outside the bead core 51a in the tire radial direction E. According to the present embodiment, a plurality (two, according to the present embodiment) of stiffeners 51b1, 51b2 of different hardness are included as the stiffener 51b. The stiffener 51b1, disposed inside in the tire radial direction E, is stiffer than the stiffener 51b2, disposed outside in the tire radial direction E.

Further, the tire body 60 includes a carcass 54 consisting of one or more carcass plies that toroidally extend between the pair of bead portions 51. The carcass 54 is wrapped around the bead cores 51a and turned up from inside in the tire width direction C outward, extending to a turn-up end 54a. The carcass plies may be a radial array of carcass cords covered with rubber. In the present example, the carcass cords consist of steel cords. The number of carcass plies is not particularly limited. The diameter of the carcass cords is not particularly limited, and may be 0.8 mm to 1.2 mm, for example.

A belt 55 consisting of one or more layers (four layers in the illustrated example) of belt plies 55a to 55d is disposed outside a crown portion of the carcass 54 in the tire radial direction E. Tread rubber 53a is disposed outside of the belt 55 in the tire radial direction E. A belt cord of the belt 55 is steel cord, according to the present example. The belt cord may be at an angle relative to the tire circumferential direction F, such as an inclination angle of 30° to 60°, for example. The number of belt layers and the belt width are not particularly limited. Further, as illustrated in FIG. 1, cushion rubber 53b may be disposed in the vicinity of an end portion of the belt 55.

In addition to the bead core 51a and the stiffener 51b described above, the bead portion 51 includes a rubber chafer 51c, a nylon chafer 51d, a wire chafer 51e, and hat rubber 51f. Further, from the bead portion 51 to the sidewall portion 52, side rubber 52a is disposed outside the carcass 54 in the tire width direction C.

The outer surface of the tire body 60 according to the present embodiment is composed of the rubber chafer 51c of the bead portion 51, the side rubber 52a of the bead portion 51 and sidewall portion 52, and the tread rubber 53a of the tread portion 53.

Further, the inner surface of the tire body 60 according to the present embodiment faces a tire cavity 60a and is composed of an inner liner 56 that extends over the bead portion 51, the sidewall portion 52, and the tread portion 53.

[Communication Device 10]

Figure 2:
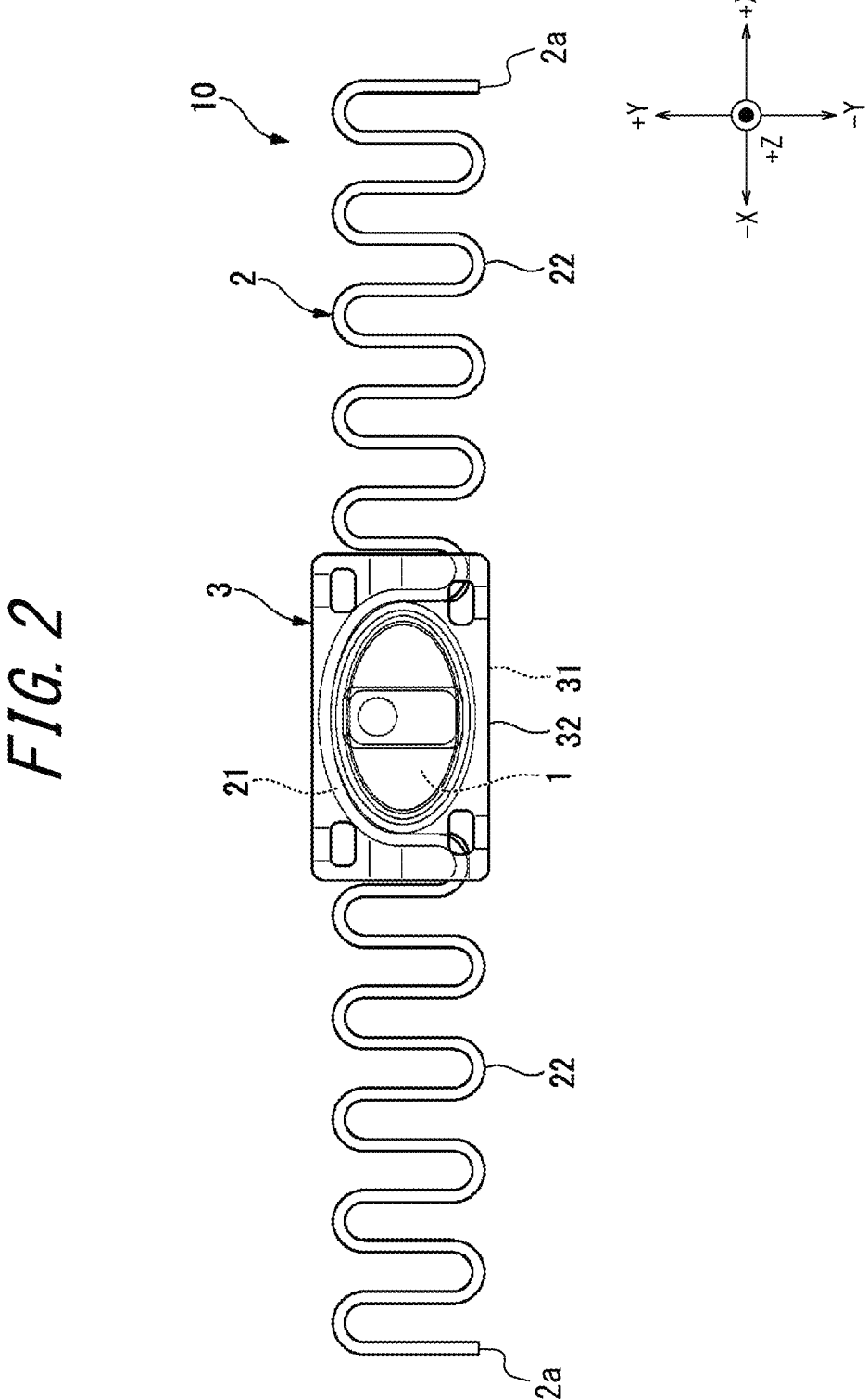
FIG. 2 is a plan view diagram of a communication device.
Figure 3:
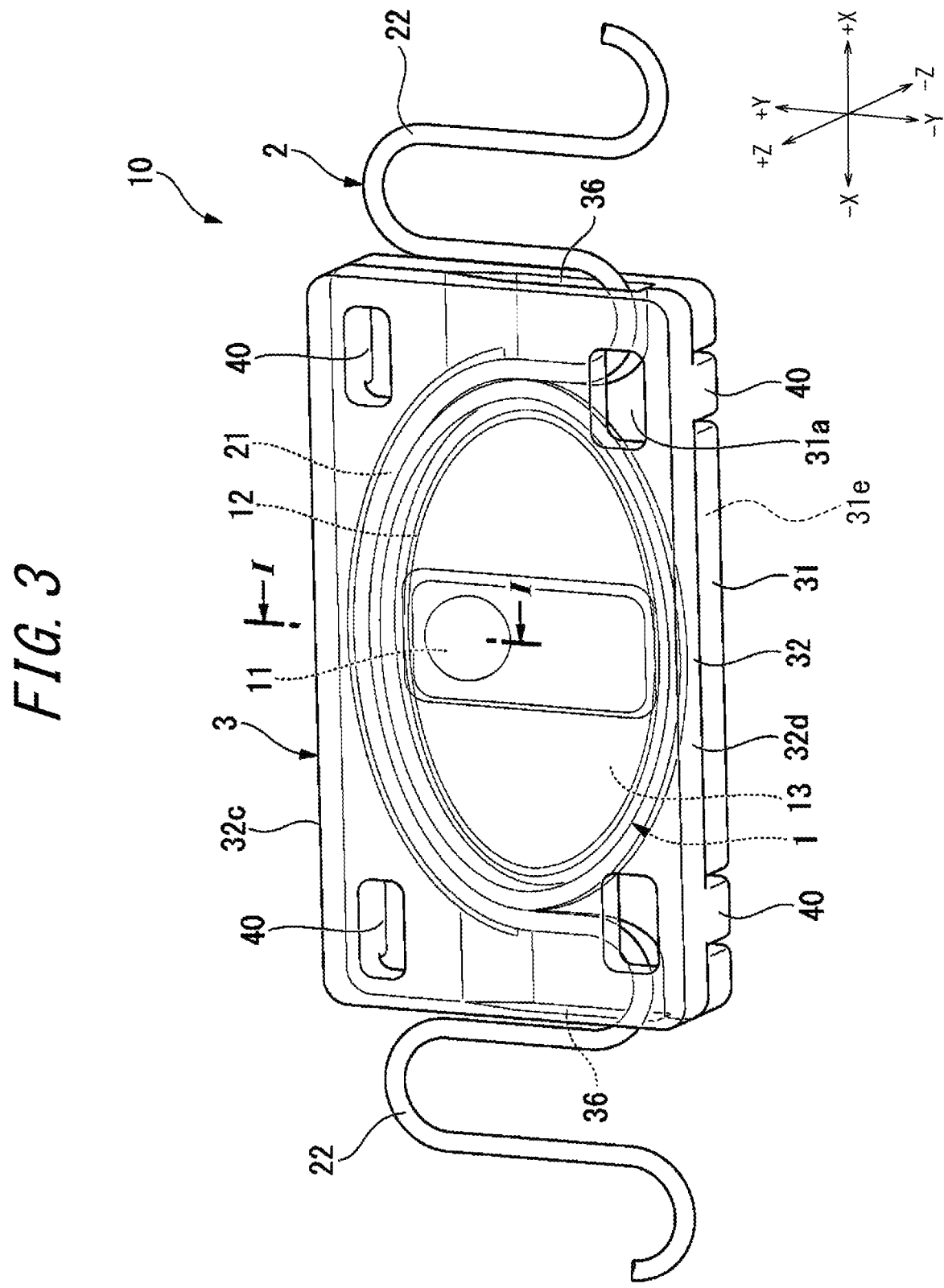
FIG. 3 is a perspective view diagram of the communication device.
Figure 4:
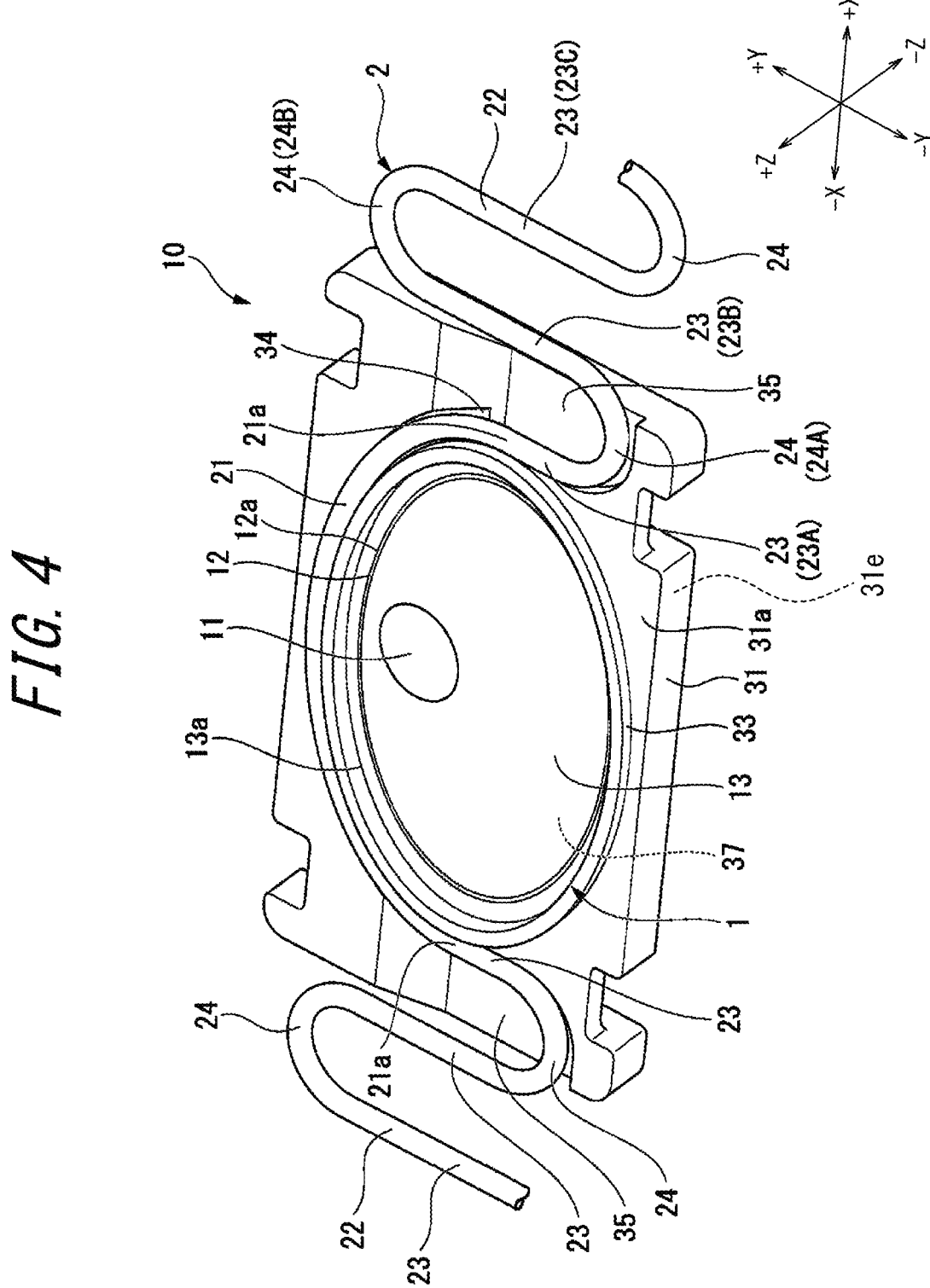
FIG. 4 is a perspective view diagram of the communication device with a lid of an outer body removed.
Figure 5:
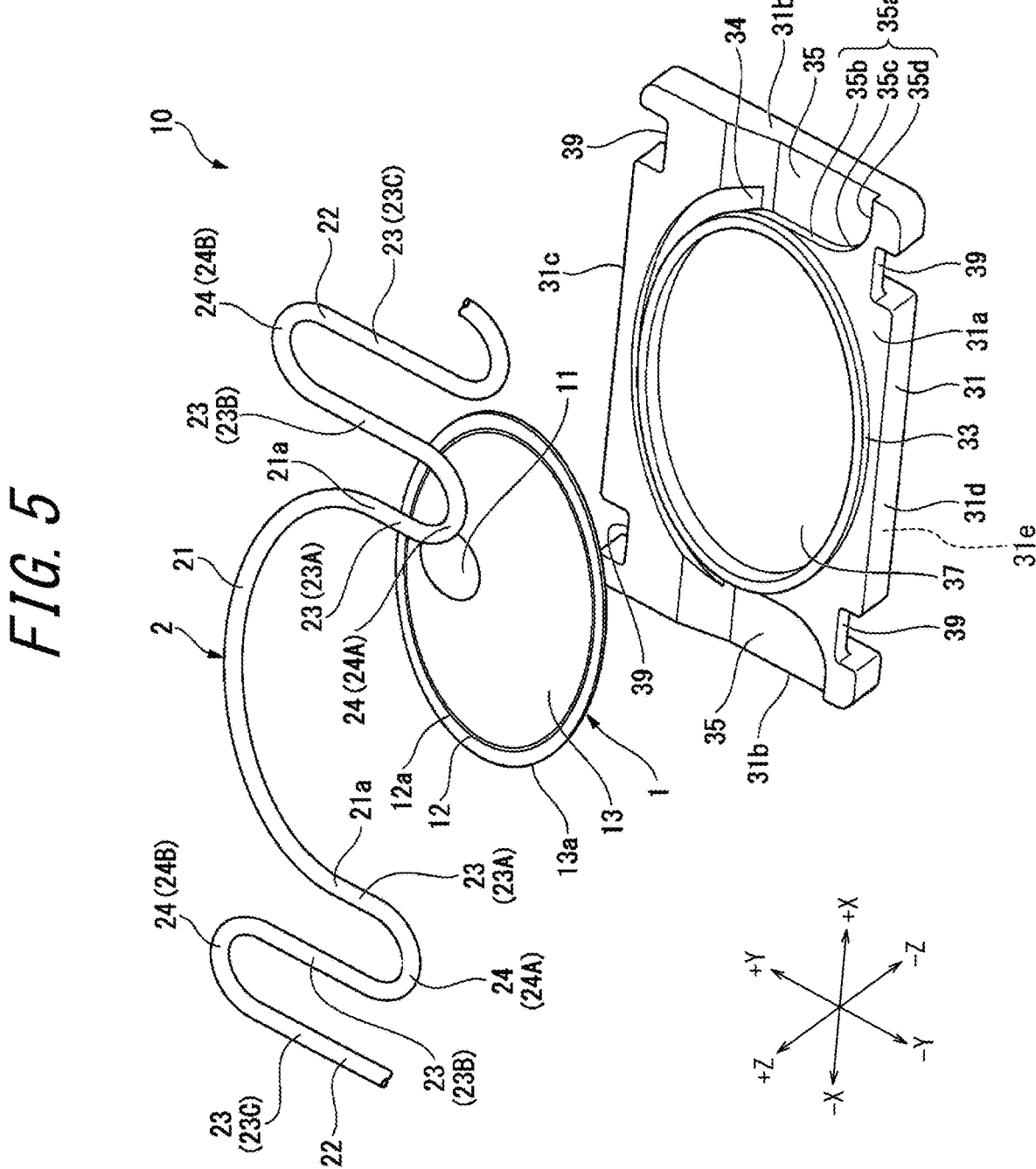
FIG. 5 is an exploded perspective view diagram of the communication device.
Figure 6:
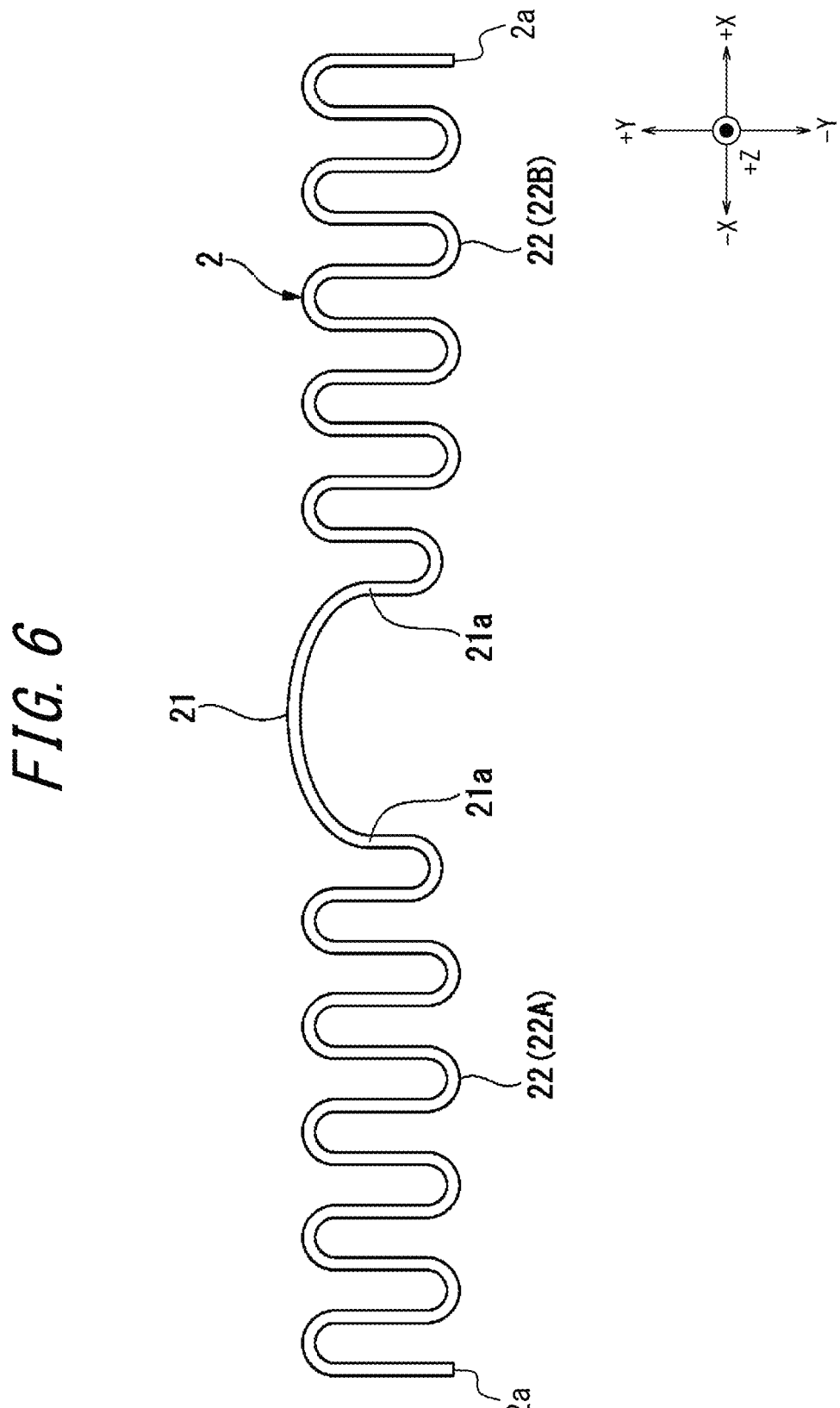
FIG. 6 is a plan view diagram of a flat antenna.
Figure 7:
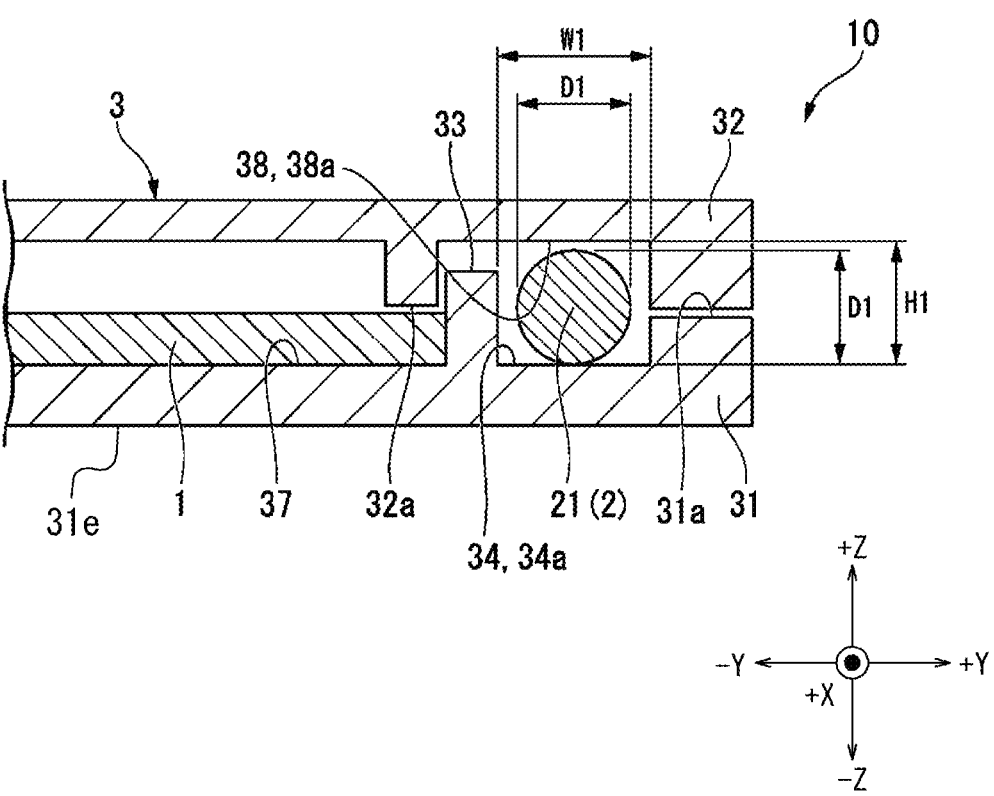
FIG. 7 is a partial cross-section diagram of the communication device.

FIG. 2 is a plan view diagram of the communication device 10. The communication device 10 according to the present embodiment is an RF tag. FIG. 3 is a perspective view diagram of the communication device 10. FIG. 4 is perspective view diagram of the communication device 10 with a lid 32 of an outer body 3 removed. FIG. 5 is an exploded perspective view diagram of the communication device 10. FIG. 6 is a plan view diagram of a flat antenna 2. FIG. 7 is a partial cross-section diagram of the communication device 10. FIG. 7 is a cross-section view of I-I in FIG. 3.

As illustrated in FIG. 2 and FIG. 3, the communication device 10 includes a substrate 1, the flat antenna 2, and the outer body 3. Hereinafter, for convenience of description, the longitudinal direction (left-right direction in FIG. 2) of a holding surface 31a (see FIG. 4) of the outer body 3 is referred to as the X direction. One direction along the X direction (to the right in FIG. 2) is referred to as the +X direction. The other direction along the X direction (to the left in FIG. 2) is referred to as the −X direction. The short direction of the holding surface 31a (see FIG. 4) of the outer body 3 is referred to as the Y direction. The Y direction is orthogonal to the X direction in the plane along the holding surface 31a. One direction along the Y direction (upward in FIG. 2) is referred to as the +Y direction. The other direction along the Y direction (downward in FIG. 2) is referred to as the −Y direction. The direction perpendicular to the holding surface 31a of the outer body 3 is referred to as the Z direction. The Z direction is perpendicular to the X and Y directions. A view from the Z direction is referred to as a planar view (see FIG. 2). The Z axis is the central axis along the Z direction.

As illustrated in FIG. 4, the substrate 1 includes an IC chip 11, an antenna 12, and a base material 13.

The base material 13 is formed in a plate-like shape. The shape of the base material 13 in planar view is not particularly limited. Preferably at least a portion of a circumferential periphery 13a is a curved shape. The curved shape may be, for example, an elliptical arc, a circular arc, a higher-order curvilinear shape (for example, a quadratic curve), or the like. Examples of higher-order curvilinear shapes include a parabolic shape, a hyperbolic shape, and the like. The external shape of the base material 13 in planar view may be, for example, elliptical, circular, oval (a race-track shape), or the like. The external shape of the base material 13 in planar view is preferably noncircular. According to the present embodiment, the base material 13 has an elliptical shape. The base material 13 is oriented with the major axis length along the X direction. A glass epoxy resin substrate, a ceramic, a plastic film, or the like may be used as the base material 13.

The IC chip 11 is able to write and read information contactlessly via the antenna 12 and the flat antenna 2. The IC chip 11 is mounted on the base material 13.

The antenna 12 is, for example, an electrically conductive layer formed on one side of the base material 13. The electrically conductive layer consists of, for example, an electrically conductive foil, a plating layer, an electrically conductive ink layer, or the like. The electrically conductive foil is, for example, a metal foil composed of copper, silver, gold, platinum, aluminum, or the like. The electrically conductive foil is formed into a defined shape by etching or the like. The plating layer is composed of a metal such as copper, silver, gold, platinum, aluminum, or the like. The electrically conductive ink layer is formed by printing or the like using electrically conductive ink. Electrically conductive ink contains electrically conductive particles formed of metal, carbon material, or the like.

The antenna 12 is loop-shaped. The antenna 12 has, for example, a curved shape following the circumferential periphery 13a of the base material 13. The antenna 12 is formed as an elliptical loop. The antenna 12 is electrically connected to the IC chip 11.

The flat antenna 2 is a booster antenna. The flat antenna 2 is, for example, linear. The flat antenna 2 is formed of a metal, such as steel, stainless steel, copper, a copper alloy, or the like. The flat antenna 2 may be formed of brass-plated steel wire, for example. The flat antenna 2 is separate from the substrate 1. It suffices that the flat antenna 2 is configured to extend in an antenna in-plane direction B (in-plane direction of the XY plane according to the present embodiment), which is perpendicular to a thickness direction A (Z direction according to the present embodiment), and the flat antenna 2 is not limited to the flat wire antenna consisting of a wire body as in the present embodiment. The flat antenna 2 may be, for example, a flat plate antenna consisting of a plate-like body.

The flat antenna 2 includes an electromagnetic field coupling portion 21 and a pair of extension portions 22. The electromagnetic field coupling portion 21 has a curved shape. Here, "curved shape" is a shape that bends smoothly without a sharply bent portion. As a curved shape, examples include an elliptical arc, a circular arc, a higher-order curvilinear shape (for example, a quadratic curve), and the like. As a higher-order curvilinear shape, examples include a parabolic shape, a hyperbolic shape, and the like. The electromagnetic field coupling portion 21 has a semi-elliptical shape. In detail, the electromagnetic field coupling portion 21 has a semi-elliptical shape, extending from one apex (apex intersecting the major axis) to the other apex (apex intersecting the major axis) of the elliptical shape.

The electromagnetic field coupling portion 21 is shaped to enclose at least a portion of the substrate 1 in planar view. The electromagnetic field coupling portion 21 encloses a range from one apex (apex intersecting the major axis) to the other apex (apex intersecting the major axis) of the substrate 1 having an elliptical shape (half circumference range on the +Y direction side).

The electromagnetic field coupling portion 21 has a curved shape (for example, an elliptical arc) following the circumferential periphery 12a of the antenna 12 in planar view. The clearance distance between the electromagnetic field coupling portion 21 and the circumferential periphery 12a is approximately constant. The electromagnetic field coupling portion 21 is disposed outside the circumferential periphery 13a of the substrate 1 in planar view, in the vicinity of the circumferential periphery 13a. The electromagnetic field coupling portion 21 is shaped to follow the shape of the circumferential periphery 13a in planar view. The clearance distance between the electromagnetic field coupling portion 21 and the circumferential periphery 13a is approximately constant.

The electromagnetic field coupling portion 21 couples electromagnetic fields with the antenna 12 contactlessly. Electromagnetic field coupling is, for example, one of electric field coupling or magnetic field coupling. The shape of a cross-section perpendicular to the longitudinal direction of the electromagnetic field coupling portion 21 is, for example, circular (see FIG. 7).

The extension portions 22 respectively extend from one and the other end portions 21a of the electromagnetic field coupling portion 21. As illustrated in FIG. 6, a first extension portion 22A, one of the pair of the extension portions 22, extends in the −X direction, while meandering, from the end portion 21a in the −X direction of the electromagnetic field coupling portion 21. A second extending portion 22B, the other of the pair of the extension portions 22, extends in the +X direction, while meandering, from the end portion 21a in the +X direction of the electromagnetic field coupling portion 21.

The planar view shape of the extension portions 22 is, for example, meandering, wavy-shaped, zigzag-shaped, or the like. The extension portions 22 have a meandering shape.

As illustrated in FIG. 5, the extension portions 22 each include a plurality of straight sections 23 and a plurality of turn-back sections 24. The straight sections 23 are straight along the Y direction. The plurality of the straight sections 23 are spaced apart in the X direction. The turn-back sections 24 connect end portions of adjacent straight sections 23. The turn-back sections 24 each have a curved shape (for example, an arc shape).

Of the plurality of the straight sections 23, the straight sections 23 closest to the electromagnetic field coupling portion 21 are referred to as "first straight sections 23A". Of the plurality of the straight sections 23, the straight sections 23 second closest to the electromagnetic field coupling portion 21 are referred to as "second straight sections 23B". Of the plurality of the straight sections 23, the straight sections 23 third closest to the electromagnetic field coupling portion 21 are referred to as "third straight sections 23C". The turn-back sections 24 connecting the first straight sections 23A and the second straight sections 23B are referred to as "first turn-back sections 24A". The turn-back sections 24 connecting the second straight sections 23B and the third straight sections 23C are referred to as "second turn-back sections 24B".

The first straight sections 23A extend in the −Y direction from the end portions 21A of the electromagnetic field coupling portion 21. The first turn-back portions 24A curve and extend from the −Y direction end portions of the first straight sections 23A to reach the −Y direction end portions of the second straight sections 23B. Of the extension portions 22, the first straight sections 23 A and a portion of the first turn-back sections 24A are inside the outer body 3, while other portions of the extension portions 22 extend outside the outer body 3 (see FIG. 4).

The outer body 3 holds the substrate 1 and the flat antenna 2 on the holding surface 31a.

More specifically, as illustrated in FIG. 3, according to the present embodiment, the outer body 3 includes a main body 31 that is plate-like and the lid 32 that is plate-like. One side of the main body 31 in the thickness direction is the holding surface 31a. In the communication device 10 according to the present embodiment, with the substrate 1 and the flat antenna 2 held on the holding surface 31a of the main body 31, the lid 32 is attached to cover the holding surface 31a of the main body 31. As a result, the entirety of the substrate 1 and part of the flat antenna 2 are accommodated between the holding surface 31a of the body 31 and the lid 32.

The outer body 3 as a whole has a plate-like shape. The main body 31 and the lid 32 are, for example, formed of resin. As a resin, examples include polyamide resin such as nylon 6,6; polyester resin such as polyethylene terephthalate (PET); polyolefin resin such as polyethylene; fluoropolymer ethylene resin such as polyvinyl fluoride; vinyl polymer such as polyvinyl chloride; acrylic resin such as polymethyl methacrylate; and the like.

As illustrated in FIG. 5, the main body 31 has a rectangular shape in planar view. One side of the main body 31, the holding surface 31*a*, has a substrate holding recess 37 (substrate holding portion), an antenna holding groove 34, and a pair of side recesses 35. The substrate holding recess 37 is formed by a substrate holding protrusion 33. The substrate holding recess 37 is a recess surrounded by the substrate holding protrusion 33.

The substrate holding protrusion 33 is an annular rib projection. The substrate holding protrusion 33 is curved (for example, elliptical) following the circumferential periphery 13*a* of the substrate 1. The substrate holding protrusion 33 protrudes in the +Z direction from the holding surface 31*a*. The shape of a cross-section perpendicular to the longitudinal direction of the substrate holding protrusion 33 is, for example, rectangular. The substrate holding protrusion 33 is curved (for example, elliptical) following the circumferential periphery 12*a* of the antenna 12 in planar view.

The substrate holding recess 37 holds the substrate 1. The substrate holding recess 37 has a shape (for example, elliptical) following the circumferential periphery 13*a* of the substrate 1. The internal dimensions (inner diameter) of the substrate holding recess 37 are approximately the same as the external dimensions (outer diameter) of the substrate 1 or slightly larger than the external dimensions (outer diameter) of the substrate 1. In planar view, the substrate holding recess 37 has a similar shape to the substrate 1.

When the substrate 1 and the substrate holding recess 37 are noncircular (for example, elliptical), the substrate 1 can be restricted from tilting around the Z-axis and the correct orientation of the substrate 1 can be maintained. Accordingly, the electromagnetic field coupling between the antenna 12 and the electromagnetic field coupling portion 21 can be maintained.

The antenna holding groove 34 accommodates the electromagnetic field coupling portion 21 of the flat antenna 2 (see FIG. 4 and FIG. 7). The antenna holding groove 34 is formed on the outside of the substrate holding protrusion 33, in close proximity to the substrate holding protrusion 33. The antenna holding groove 34 has a shape following the substrate holding protrusion 33 in planar view. The antenna holding groove 34 has a curved shape (for example, an elliptical arc) following the circumferential periphery 12*a* of the antenna 12 in planar view. The antenna holding groove 34 has a curved shape (for example, an elliptical arc) following the circumferential periphery 13*a* of the substrate 1 in planar view. The antenna holding groove 34 is semi-elliptical in planar view. In detail, the antenna holding groove 34 has a semi-elliptical shape, extending from one apex (apex intersecting the major axis) to the other apex (apex intersecting the major axis) of the elliptical shape.

The antenna holding groove 34 is shaped to enclose at least a portion of the substrate 1 in planar view. The antenna holding groove 34 encloses a range from one apex (apex intersecting the major axis) to the other apex (apex intersecting the major axis) of the substrate 1 having an elliptical shape (half circumference range on the +Y direction side).

As illustrated in FIG. 7, a cross-section perpendicular to the longitudinal direction of the antenna holding groove 34 is, for example, rectangular. The width (internal dimension) W1 of the antenna holding groove 34 is larger than the outer diameter (external dimension) D1 of the electromagnetic field coupling portion 21. The difference between the width W1 and the outer diameter D1 may be, for example, 0.01 mm to 1 mm (preferably 0.05 mm to 0.2 mm). The width W1 of the antenna holding groove 34 is larger than the outer diameter D1 of the electromagnetic field coupling part 21, and therefore the electromagnetic field coupling portion 21 is accommodated in the antenna holding groove 34 in a displaceable state in the wire radial direction (for example, the Y direction). The "wire radial direction" is perpendicular to the longitudinal direction of the electromagnetic field coupling portion 21. The electromagnetic field coupling portion 21 is also displaceable in the longitudinal direction relative to the antenna holding groove 34.

The depth of the antenna holding groove 34 is defined so that the height (internal dimension) H1 from a bottom surface 34*a* of the antenna holding groove 34 to the lid 32 (top surface 38*a*) is larger than the outer diameter D1 of the electromagnetic field coupling portion 21. The difference between the height H1 and the outer diameter D1 may be, for example, 0.01 mm to 1 mm (preferably 0.05 mm to 0.2 mm). The height H1 of the antenna holding groove 34 is larger than the outer diameter D1 of the electromagnetic field coupling part 21, and therefore the electromagnetic field coupling portion 21 is accommodated in the antenna holding groove 34 in a displaceable state in the wire radial direction (for example, the Z direction).

As illustrated in FIG. 5, the side recesses 35 are formed on either side of the holding surface 31*a*. The side recesses 35 are formed in regions including side edges 31*b* of the main body 31 in the X direction. The inner circumferential periphery 35*a* of each of the side recesses 35 has a first straight section 35*b* along the Y direction, a curved section 35*c*, and a second straight section 35*d* along the X direction.

The first straight section 35*b* starts at an inner circumferential periphery end of the antenna holding groove 34 and extends in the −Y direction. The curved section 35*c* extends from an end of the first straight section 35*b* at a gradually decreasing inclination angle with respect to the X direction. The second straight section 35*d* is a portion from an end of the curved section 35*c* to the side edge 31*b* along the X direction.

As illustrated in FIG. 4, the side recesses 35 include, in planar view, the first straight sections 23A and a portion of the first turn-back sections 24A of the flat antenna 2. The first straight sections 23A are in close proximity to the first straight sections 35*b* (see FIG. 5). The first turn-back sections 24A are in close proximity to the curved sections 35*c* (see FIG. 5). Each of the side recesses 35 accommodates at least a portion of a defined length range of the flat antenna 2 (the first straight section 23A and a portion of the first turn-back section 24A).

As illustrated in FIG. 3, the side recesses 35 extend far enough in the Y direction to form slit-shaped side end openings 36 in the side edges 31*b* extending in the Y direction (direction along the holding surface 31*a*). The flat antenna 2 extends out of the outer body 3 through the side end openings 36. As illustrated in FIG. 5, two locking recesses 39 are formed at an end edge 31*c* of the main body 31 in the +Y direction, in different positions along the X direction. An end edge 31*d* of the main body 31 in the −Y direction also has two locking recesses 39, in different positions along the X direction.

As illustrated in FIG. 3, the lid 32 has a rectangular shape in planar view. The lid 32 is the same shape as the main body 31 and is installed opposite the holding surface 31*a* of the main body 31. The lid 32 is installed to overlap the holding surface 31*a* of the main body 31 in planar view.

As illustrated in FIG. 7, a facing surface 32*a* of the lid 32 is a surface facing the holding surface 31*a* of the main body 31. A positioning groove 38 is formed on the facing surface 32*a*. The positioning groove 38 is an annular groove. The shape of a cross-section perpendicular to the longitudinal direction of the positioning groove 38 is, for example, rectangular.

The positioning groove 38 has a curved shape (for example, elliptical) in accordance with the substrate holding protrusion 33 and the antenna holding groove 34. The positioning groove 38 has a width in planar view that covers both the substrate holding protrusion 33 and the antenna holding groove 34. A portion of a top surface 38a of the positioning groove 38 faces the bottom surface 34a of the antenna holding groove 34.

As illustrated in FIG. 3, two locking projections 40 are formed at an end edge 32c of the lid 32 in the +Y direction, in different positions along the X direction. An end edge 32d of the lid 32 in the –Y direction also has two locking projections 40 formed in different positions along the X direction.

Each of the locking projections 40 has a locking hook portion (not illustrated) formed at an end thereof. The locking projections 40 are inserted into the locking recesses 39 of the main body 31. The locking hook portions of the locking projections 40 lock onto the main body 31. This allows the lid 32 to be detachably coupled to the main body 31.

The outer body 3 is not fixed relative to the flat antenna 2. That is, the outer body 3 is not fixed to the flat antenna 2.

The communication device 10 may be installed in a molded article made of rubber or resin, for example. For example, the communication device 10 may be embedded in a molded article. The molded article is, for example, an elastic body, and is elastically deformable. When the molded article is stretched, bent, or otherwise deformed, the flat antenna 2 may be subjected to external force. For example, a tensile force may act on the extension portions 22 in directions away from the outer body 3 along the X direction. The extension portions 22 may also be subjected to a force along the X direction in a direction towards the outer body 3. When the communication device 10 is installed in the tire body 60, as in the present embodiment, the communication device 10 may be installed enclosed in a fixing member made of a sheet of rubber (lamination rubber). This not only helps prevent damage to the communication device 10, but also allows the communication device 10 to be easily incorporated into the tire 50 with less risk of damage when the communication device 10 is incorporated into the tire after the communication device 10 is enclosed in a fixing member.

[Effects of RFID Tag]

In the communication device 10, the electromagnetic field coupling portion 21 of the flat antenna 2 is accommodated in the antenna holding groove 34 in a displaceable state in the wire radial direction (direction perpendicular to the longitudinal direction of the electromagnetic field coupling portion 21) (see FIG. 7). The electromagnetic field coupling portion 21 is displaceable, and therefore stress in the flat antenna 2 can be relieved when an external force acts on the flat antenna 2. Thus, damage to the flat antenna 2 is less likely to occur. In contrast, if the flat antenna were fixed to the outer body, then when an external force acts on the flat antenna, stress would be concentrated at a base end portion (root portion) of the flat antenna extending from the outer body, and damage could easily occur at this point.

The electromagnetic field coupling portion 21 of the flat antenna 2 has a shape following the circumferential periphery 12a of the antenna 12 of the substrate 1, allowing the electromagnetic field coupling portion 21 to be sufficiently electromagnetically coupled to the antenna 12. The antenna holding groove 34 has a shape following the circumferential periphery 12a of the antenna 12, and therefore the electromagnetic field coupling portion 21 of the flat antenna 2 can be positioned alongside the antenna 12. Accordingly, the electromagnetic field coupling portion 21 can be sufficiently electromagnetically coupled to the antenna 12.

The electromagnetic field coupling portion 21 of the flat antenna 2 has a curved shape (for example, a semi-elliptical shape), and therefore even when an external force acts on the flat antenna 2, stress concentration is less likely to occur, compared to a rectangular shape. Thus, damage to the flat antenna 2 is less likely to occur. In contrast, if the electromagnetic field coupling portion were rectangular in shape, an external force acting on the flat antenna might cause stress to concentrate at a corner (bent portion), and damage could easily occur at this point.

The antenna holding groove 34 has a shape following the circumferential periphery 13a of the substrate 1, and therefore the electromagnetic field coupling portion 21 of the flat antenna 2 can be positioned alongside the antenna 12. Accordingly, the electromagnetic field coupling portion 21 can be sufficiently electromagnetically coupled to the antenna 12.

The outer body 3 includes the main body 31 and the lid 32 that is overlaid on the holding surface 31a. The substrate holding recess 37 and the antenna holding groove 34 are formed on the holding surface 31a. Therefore, the lid 32 prevents the substrate 1 and the flat antenna 2 from falling out of the main body 31. Therefore, the substrate 1 and the flat antenna 2 can be stably held in the outer body 3.

In the communication device 10, the slit-shape side end openings 36 extending in the Y direction (along the holding surface 31a) are formed in the side edges 31b of the outer body 3. Accordingly, the flat antenna 2 can change position in the Y direction relative to the outer body 3. Therefore, when an external force acts on the flat antenna 2, stress is more easily relieved by displacement. Thus, damage to the flat antenna 2 is less likely to occur.

For example, in the communication device 10, the circumferential periphery 13a of the substrate 1 and the circumferential periphery 12a of the antenna 12 are curved over their entire circumference, but the substrate and antenna may have curved shapes over just a portion of their circumferential peripheries. The outer body 3 includes the main body 31 and the lid 32, but the configuration of the outer body is not particularly limited. For example, the outer body may be configured to not include a lid. The outer body is not limited to a plate-like shape, and may have another shape (for example, a block shape).

As described above, the communication device 10 includes the flat antenna 2. As illustrated in FIG. 1, the communication device 10 is disposed so that the antenna in-plane direction B (in-plane direction of the XY plane according to the present embodiment), which is perpendicular to the thickness direction A (Z direction according to the present embodiment) of the flat antenna 2, is along the outer surface of the tire body 60. In other words, the communication device 10 is disposed so that the flat antenna 2 faces the outer surface of the tire body 60 in the thickness direction A.

More specifically, the communication device 10 according to the present embodiment is embedded in the sidewall portion 52. The communication device 10 according to the present embodiment is disposed so that the antenna in-plane direction B of the flat antenna 2 is along the outer surface of the sidewall portion 52 of the tire body 60. In other words, the communication device 10 according to the present embodiment is disposed so that the flat antenna 2 faces the outer surface of the sidewall portion 52 of the tire body 60 in the thickness direction A.

In particular, the communication device 10 according to the present embodiment is disposed so that the antenna in-plane direction B of the flat antenna 2 is along the tire radial direction E. In other words, the communication device 10 according to the present embodiment is disposed so that the thickness direction A of the flat antenna 2 is along the tire width direction C.

Figure 8:
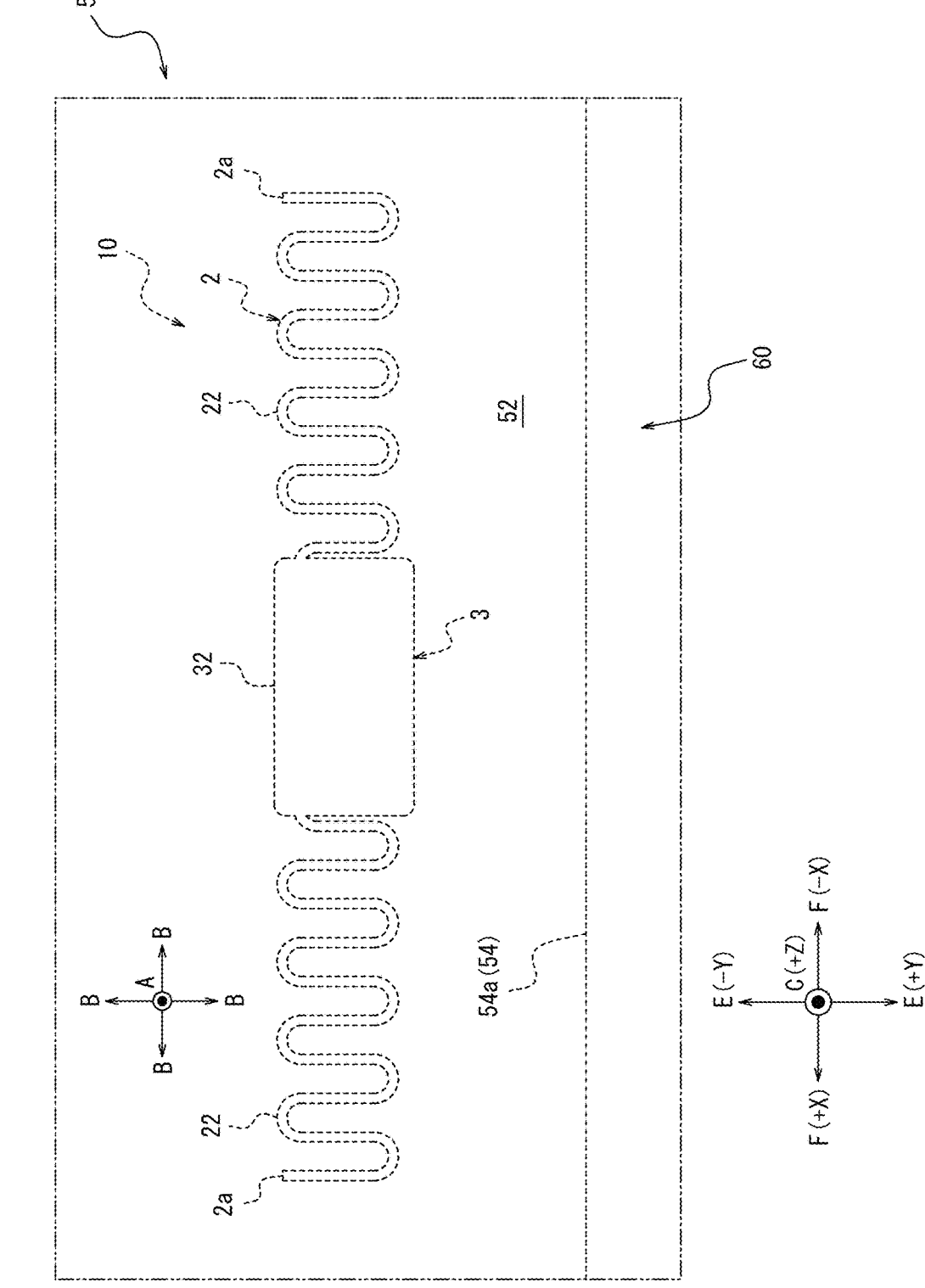
FIG. 8 is a diagram illustrating an enlargement of a region in the vicinity of the communication device in a side surface view of the pneumatic tire illustrated in FIG. 1.

FIG. 8 is a diagram illustrating an enlargement in the vicinity of the communication device 10 of a side surface view of the tire 50 illustrated in FIG. 1, viewed from outside along the tire width direction C. In FIG. 8, the location of the communication device 10 is indicated by a dashed line. As illustrated in FIG. 8, the communication device 10 is disposed so that the flat antenna 2 extends in the tire circumferential direction F. That is, the communication device 10 according to the present embodiment is disposed so that the X direction is along the tire circumferential direction F.

Further, as illustrated in FIG. 1, the communication device 10 according to the present embodiment is disposed so that the holding surface 31a of the outer body 3 faces the side of the outer surface of the tire body 60 (left side in FIG. 1). More specifically, the communication device 10 according to the present embodiment is disposed so that the holding surface 31a of the outer body 3 is directly opposite the outer surface of the tire body 60 in the thickness direction A. This arrangement makes it easier to improve the communication performance of the communication device 10 with a reader from the outer side of the tire body 60 (left side in FIG. 1). In particular, in the communication device 10 according to the present embodiment, the antenna holding groove 34 (see FIG. 7, etc.) is formed in the holding surface 31a of the main body 31 of the outer body 3 to accommodate the electromagnetic field coupling portion 21 of the flat antenna 2. Therefore, the communication performance of the flat antenna 2 is better on the open side of the antenna holding groove 34 than on the bottom surface 34a side of the antenna holding groove 34. That is, in the communication device 10 according to the present embodiment, the flat antenna 2 can increase communication performance with a reader from the holding side 31a of the main body 31, when compared with from a back surface 31e, the side opposite the holding side 31a of the main body 31. Therefore, in terms of communication performance with a reader from outside the tire 50, the communication device 10 is preferably disposed so that the holding surface 31a of the outer body 3 faces the side of the outer surface of the tire body 60 (left side in FIG. 1).

Figure 9:
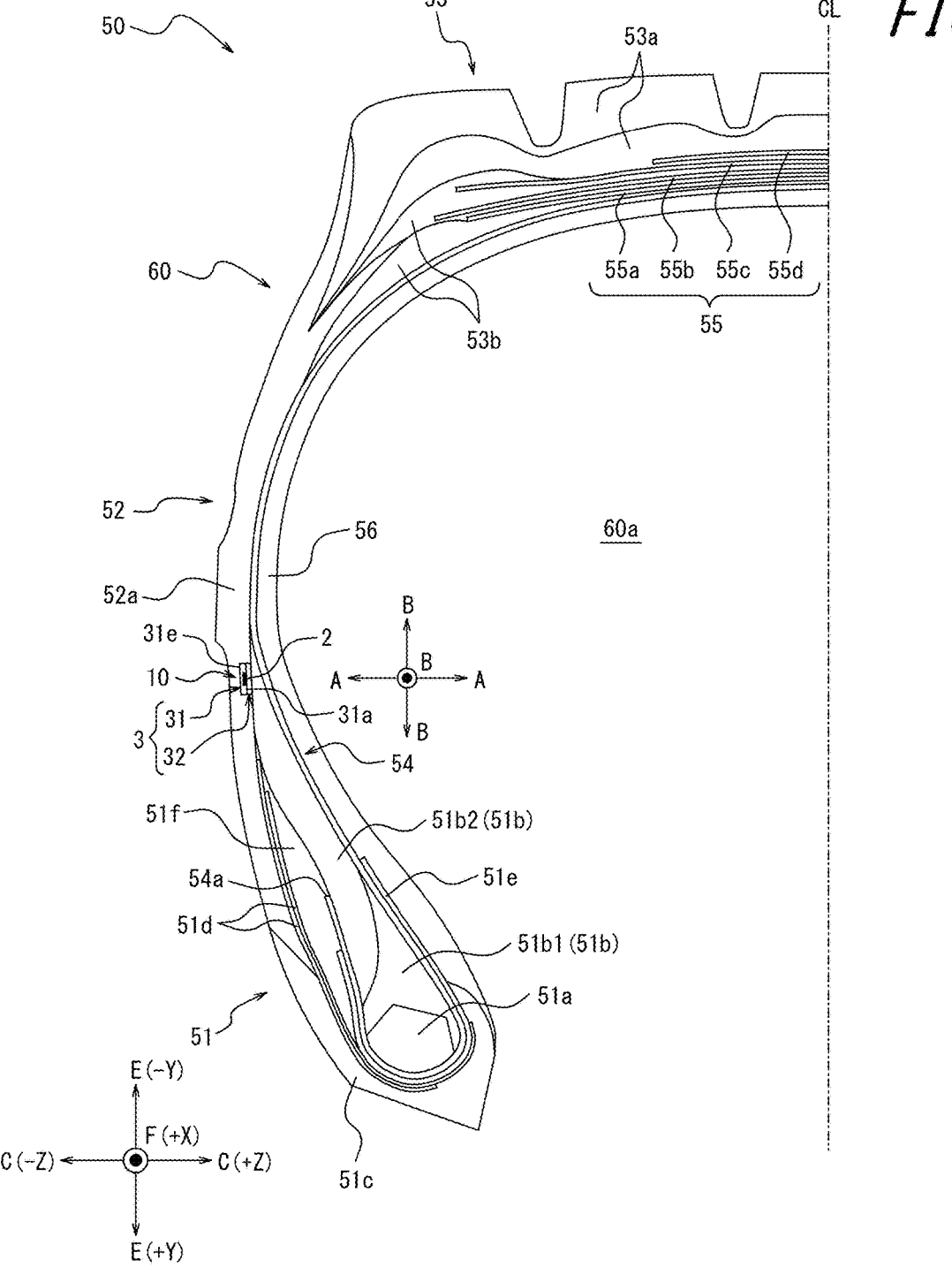
FIG. 9 is a diagram illustrating a variation of the communication device illustrated in FIG. 1 with a different orientation.

FIG. 9 illustrates a variation of the communication device 10 illustrated in FIG. 1 with a different orientation. As illustrated in FIG. 9, in terms of durability of the flat antenna 2, the communication device 10 may be disposed so that the back surface 31e, which is the opposite side to the holding surface 31a of the outer body 3, faces the outer side of the tire body 60 (left side in FIG. 9). As an example, the communication device 10 may be disposed so that the back surface 31e, which is the opposite side of the holding surface 31a of the outer body 3, is directly opposite the outer surface of the tire body 60 in the thickness direction A. In particular, in the communication device 10 according to the present embodiment, the antenna holding groove 34 (see FIG. 7, etc.) is formed in the holding surface 31a of the main body 31 of the outer body 3 to accommodate the electromagnetic field coupling portion 21 of the flat antenna 2. Therefore, the durability of the flat antenna 2 from the outside of the tire 50 is better on the bottom surface 34a side of the antenna holding groove 34 than on the open side of the antenna holding groove 34. That is, in the communication device 10 according to the present embodiment, the flat antenna 2 has a higher durability from the back surface 31e, which is the side opposite the holding surface 31a of the main body 31, than durability from the holding surface 31a of the main body 31. Therefore, in terms of durability of the flat antenna 2 from outside the tire 50, the communication device 10 is preferably disposed so that the back surface 31e of the outer body 3 faces the side of the outer surface of the tire body 60 (left side in FIG. 9).

As illustrated in FIG. 1 and FIG. 8, the communication device 10 according to the present embodiment is embedded in the sidewall portion 52 of the tire body 60 in one direction along the tire radial direction E relative to the turn-up end 54a of the carcass 54 (according to the present embodiment, outside in the tire radial direction E, and the upper side in FIG. 8). A tip 2a of the flat wire antenna as the flat antenna 2 is not disposed at a position corresponding to an end of the flat wire antenna in the other direction along the tire radial direction E (according to the present embodiment, inside in the tire radial direction E, and the lower side in FIG. 8). In this way, the tip 2a of the flat wire antenna as the flat antenna 2 and the turn-up end 54a of the carcass 54 are separated from each other. This inhibits the positions of the tip 2a of the flat wire antenna as the flat antenna 2, which is easily subject to strain concentration due to rigidity step differences and the like, and the turn-up end 54a of the carcass 54 from becoming closer together, thereby improving the durability of the tire 50.

In particular, as illustrated in FIG. 8, the tip 2a of the flat wire antenna as the flat antenna 2 preferably terminates facing one direction in the tire radial direction E (according to the present embodiment, outside in tire radial direction E, and the upper side in FIG. 8). In this way, the tip 2a of the flat wire antenna as the flat antenna 2 and the turn-up end 54a of the carcass 54 are not disposed so that they face each other along the tire radial direction E. This allows strain between the tip 2a of the flat wire antenna as the flat antenna 2 and the turn-up end 54a of the carcass 54 to be suppressed compared to a configuration in which the tip 2a of the flat wire antenna as the flat antenna 2 and the turn-up end 54a of the carcass 54 are disposed so that they face each other in the tire radial direction E. Accordingly, the durability of the tire 50 can be further improved.

Further, as illustrated in FIG. 8, the tip 2a of the flat wire antenna as the flat antenna 2 is preferably disposed at a position corresponding to an end of the flat wire antenna in one direction along the tire radial direction E (in the present embodiment, outside in tire radial direction E, and the upper side in FIG. 8). In this way, the tip of the flat wire antenna as the flat antenna 2 and the turn-up end 54a of the carcass 54 can be further separated from each other. As a result, the durability of the tire 50 can be further improved.

Figure 10:
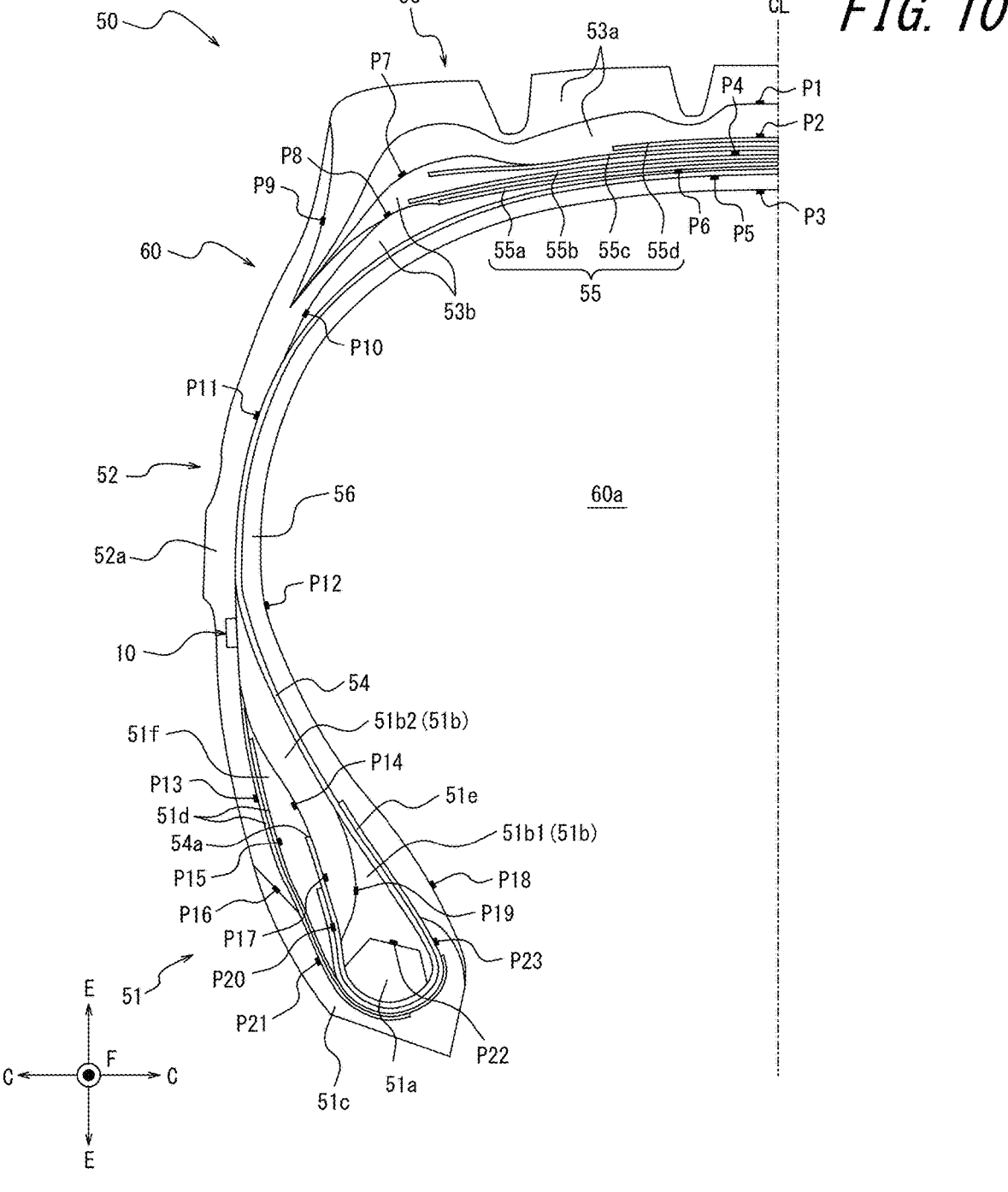
FIG. 10 is a diagram illustrating variations in location of the communication device illustrated in FIG. 1.

As described above, in the tire 50 according to the present embodiment, the communication device 10 is embedded in the sidewall portion 52 of the tire body 60, but is not limited to this configuration. The communication device 10 may be embedded in other locations of the tire body 60. Further, the communication device 10 may be attached to an inner surface of the tire body 60 facing the tire cavity 60a. The following is an illustrative description of the possible location of the communication device 10 in a tire width direction cross-section view of the tire 50, with reference to FIG. 10. In FIG. 10, in addition to the location of the communication device 10 illustrated in FIG. 1, FIG. 8, and FIG. 9 (indicated by a white rectangle in FIG. 10), examples of possible locations of the communication device 10 are indicated by black rectangles.

As mentioned above, the communication device 10 according to the present embodiment is an RF tag. Hereinafter, the communication device 10 is also referred to simply as an RF tag. As mentioned above, the RF tag includes the IC chip 11 and an antenna (according to the present embodiment, the antenna 12 of the substrate 1 and the flat antenna 2). The RF tag may be disposed, for example, sandwiched in a position between a plurality of members of the same or different types that constitute the tire body 60. In this way, the RF tag can be easily installed during tire production, improving the productivity of the tire 50 that includes the RF tag. In the present example, the RF tag is disposed in the sidewall portion 52 sandwiched between the stiffener 51*b*2 and the side rubber 52*a* as the other member adjacent to the stiffener 51*b*2, but may be disposed in another location. The RF tag may be embedded within any of the members of the tire body 60. In this way, load applied to the RF tag can be decreased compared to a case where the RF tag is disposed sandwiched in a position between a plurality of members of the tire body 60. This can improve the durability of the RF tag. In the present example, the RF tag may be embedded in a rubber member, such as the tread rubber 53*a*, the side rubber 52*a*, or the like. The RF tag is preferably not disposed at a boundary of members of different rigidity in the peripheral length direction, which is the direction along the outer surface of the tire in a tire width direction cross-section view. In this way, the RF tag is not disposed where strain is likely to be concentrated based on a rigidity step difference. This reduces the load applied to the RF tag. This can improve the durability of the RF tag. In the present example, the RF tag is preferably not disposed, for example, at the boundary between the turn-up end 54*a* of the carcass 54 and a member adjacent to the turn-up end 54*a* of the carcass 54 in a tire width direction cross-section. The number of RF tags is not particularly limited. The tire may include only one RF tag, and may include two or more RF tags. Although an RF tag is illustrated here as an example of a communication device, the communication device may be something other than an RF tag.

The RF tag may be disposed, for example, in the tread portion 53 of the tire body 60. In this way, the RF tag is not damaged by a side cut of the tire 50. The RF tag may be disposed, for example, on the tire inner surface in the tread portion 53 of the tire body 60 (see reference sign "P3" in FIG. 10). The RF tag may be disposed, for example, in a central portion of the tread in the tire width direction C (see reference signs "P1" to "P6" in FIG. 10). The central portion of the tread is a location in the tread portion 53 where deflection is less likely to be concentrated. In this way, load applied to the RF tag can be decreased. This can improve the durability of the RF tag. Further, a difference in communication performance with the RF tag from both sides of the tire 50 in the tire width direction C can be suppressed. In the present example, the RF tag may be disposed, for example, within ½ of the tread width in the tire width direction C, centered on the tire equatorial plane CL. The RF tag may be disposed, for example, at a tread edge portion in the tire width direction C (see reference signs "P7" and "P8" in FIG. 10). When the position of a reader that communicates with the RF tag is predetermined, the RF tag may be disposed, for example, on one side of the tread edge portion near such a reader. In the present example, the RF tag may be disposed, for example, within ¼ of the tread width in the tire width direction C, with the tread edge as the outer edge.

The RF tag may be disposed, for example, on the tire cavity 60*a* side from the carcass 54, which includes one or more carcass plies, extending between the bead portions. In this way, the RF tag is less likely to be damaged by an impact applied from outside the tire 50 or by damage such as a side cut or nail puncture. As an example, the RF tag may be disposed in close proximity to a surface on the tire cavity 60*a* side of the carcass 54 (see reference sign "P5" in FIG. 10). As another example, where another member is present that is closer to the tire cavity 60*a* side than the carcass 54, the RF tag may be disposed between, for example, the carcass 54 and the other member that is closer to the tire cavity 60*a* side than the carcass 54 (see reference sign "P5" in FIG. 10). An example of the other member that is closer to the tire cavity 60*a* side than the carcass 54 is an inner liner 56 that forms a tire inner surface. As another example, the RF tag may be attached to the inner surface facing the tire cavity 60*a* (hereinafter also referred to as "tire inner surface") (see reference signs "P3", "P12", and "P18" in FIG. 10). By configuring the RF tag to be attached to the tire inner surface, the RF tag is easily attachable to the tire body 60 and RF tag inspection and replacement is easily carried out. That is, the ease of installation and maintenance of the RF tag can be improved. Further, the RF tag is attached to the tire inner surface, which helps prevent the RF tag from becoming the core of a tire failure, compared to a configuration in which the RF tag is embedded inside the tire body. Further, when the carcass 54 includes a plurality of carcass plies and there is a position where the plurality of carcass plies are overlapped, the RF tag may be disposed between the overlapping carcass plies.

The RF tag may be disposed, for example, in the tread portion 53 of the tire body 60, outside in the tire radial direction E from the belt 55 that includes one or more belt plies 55*a* to 55*d* (see reference signs "P1" and "P2" in FIG. 10). As an example, the RF tag may be disposed outside in the tire radial direction E relative to the belt 55 and in close contact with the belt 55 (see reference sign "P2" in FIG. 10). As another example, when a reinforcing belt layer is included, the RF tag may be disposed outside in the tire radial direction E with respect to the reinforcing belt layer and in close contact with the reinforcing belt layer. As another example, the RF tag may be embedded in the tread rubber 53*a*, outside in the tire radial direction E from the belt 55 (see reference sign "P1" in FIG. 10). When the RF tag is disposed outside in the tire radial direction E from the belt 55 at the tread portion 53 of the tire body 60, communication with the RF tag from outside the tire 50 in the tire radial direction E is less likely to be inhibited by the belt 55. This improves communication performance with the RF tag from outside the tire 50 in the tire radial direction E.

The RF tag may be disposed, for example, in the tread portion 53 of the tire body 60, inside in the tire radial direction E from the belt 55 (see reference signs "P3", "P5" and "P6" in FIG. 10). In this way, the outer side of the RF tag in the tire radial direction E is covered by the belt 55, making the RF tag more resistant to damage from an impact from the tread surface, nail penetration, and the like. As an example, the RF tag may be disposed in the tread portion 53 of the tire body 60, between the belt 55 and the carcass 54 disposed inside in the tire radial direction E from the belt 55 (see reference sign "P6" in FIG. 10).

Further, when the belt 55 includes a plurality of the belt plies 55*a* to 55*d*, the RF tag may be disposed between any two of the belt plies 55*a* to 55*d* in the tread portion 53 of the tire body 60 (see reference sign "P4" in FIG. 10). In this way, the outer side of the RF tag in the tire radial direction E is covered by one or more of the belt plies 55*a* to 55*d*, making the RF tag more resistant to damage from an impact from the tread surface, nail penetration, and the like.

The RF tag may be disposed, for example, sandwiched between the cushion rubber 53*b* and the tread rubber 53*a* (see reference sign "P7" in FIG. 10) or between the cushion rubber 53*b* and the side rubber 52*a* (see reference sign "P10" in FIG. 10). In this way, impact on the RF tag can be mitigated by the cushion rubber 53*b*. Accordingly, the durability of the RF tag can be improved.

Further, for example, the RF tag may be embedded in the cushion rubber 53*b*. Further, the cushion rubber 53*b* may be configured as a plurality of adjacent rubber members of the same or different types. In such a case, the RF tag may be disposed sandwiched between a plurality of rubber members of the cushion rubber 53*b* (see reference sign "P8" in FIG. 10).

The RF tag may be disposed, for example, at the bead portion 51 or the sidewall portion 52 of the tire body 60. The RF tag may be disposed, for example, at one side of the sidewall portion 52 or one side of the bead portion 51 closer to a reader that can communicate with the RF tag. This can improve communication performance between the RF tag and a reader. As an example, the RF tag may be disposed between the carcass 54 and the side rubber 52*a*, or between the tread rubber 53*a* and the side rubber 52*a*.

The RF tag may be disposed, for example, in the tire radial direction E, between a position of tire maximum width and a position of the tread surface (see reference signs "P9", "P10", "P11" in FIG. 10). In this way, communication with the RF tag from outside the tire 50 in the tire radial direction E can be improved compared to a configuration in which the RF tag is disposed further inward in the tire radial direction E than the position of the tire maximum width.

The RF tag may be disposed, for example, inward in the tire radial direction E from the position of the tire maximum width (see reference signs "P12" to "P23" in FIG. 10). In this way, the RF tag is disposed in the vicinity of the bead portion 51 that has high rigidity. This reduces the load applied to the RF tag. This can improve the durability of the RF tag. As an example, the RF tag may be disposed adjacent to the bead core 51*a* in the tire radial direction E or the tire width direction C (see reference sign "P22" in FIG. 10). Strain is less concentrated near the bead core 51*a*. This reduces the load applied to the RF tag. This can improve the durability of the RF tag.

In particular, the RF tag is preferably disposed inward in the tire radial direction E from the position of the tire maximum width and outward in the tire radial direction E from the bead core 51*a* of the bead portion 51 (see reference signs "P12" to "P20" in FIG. 10). In this way, the durability of the RF tag can be improved and communication between the RF tag and a reader is not likely to be impeded by the bead core 51*a*, increasing communication performance of the RF tag.

When the side rubber 52*a* includes a plurality of rubber members of the same or different types adjacent to each other in the tire radial direction E, the RF tag may be disposed sandwiched between the plurality of rubber members of the side rubber 52*a*.

The RF tag may be disposed sandwiched between the stiffener 51*b* and a member adjacent to the stiffener 51*b* (see white rectangle and reference signs "P14", "P17", and "P22" in FIG. 10). In this way, the RF tag can be disposed in a position where strain is less likely to be concentrated due to the position of the stiffener 51*b*. This reduces the load applied to the RF tag. This can improve the durability of the RF tag. The RF tag may be disposed, for example, sandwiched between the stiffener 51*b* and the side rubber 52*a* (see white rectangle in FIG. 10).

Further, the RF tag may be disposed sandwiched between, for example, the stiffener 51*b* and the carcass 54 (see reference sign "P17" in FIG. 10). The portion of the carcass 54 that sandwiches the RF tag together with the stiffener 51*b* may be disposed outside in the tire width direction C or inside in the tire width direction C, relative to the stiffener 51*b*. When the portion of the carcass 54 that sandwiches the RF tag together with the stiffener 51*b* is outside in the tire width direction C relative to the stiffener 51*b*, the load on the RF tag due to impact or damage from outside the tire 50 in the tire width direction C can be further decreased. This can further improve the durability of the RF tag.

The stiffener 51*b* may include a portion adjacent to the rubber chafer 51*c*. In such a case, the RF tag may be disposed sandwiched between the stiffener 51*b* and the rubber chafer 51*c*.

The stiffener 51*b* may include a portion adjacent to the hat rubber 51*f*, outside in the tire width direction C. In such a case, the RF tag may be disposed sandwiched between the stiffener 51*b* and the hat rubber 51*f* (see reference sign "P14" in FIG. 10).

The stiffener 51*b* may be configured as a plurality of rubber members having different hardness. In such a case, the RF tag may be disposed sandwiched between a plurality of rubber members (reference signs "51*b*1" and "51*b*2" in FIG. 1) of the stiffener 51*b* (see reference sign "P19" in FIG. 10).

The RF tag may be disposed sandwiched between the hat rubber 51*f* and a member adjacent to the hat rubber 51*f* (see reference signs "P14" and "P15" in FIG. 10). The RF tag may be disposed, for example, sandwiched between the hat rubber 51*f* and the carcass plies. In this way, impact on the RF tag can be mitigated by the hat rubber 51*f*. Accordingly, the durability of the RF tag can be improved.

The RF tag may be disposed, for example, sandwiched between the rubber chafer 51*c* and the side rubber 52*a* (see reference sign "P16" in FIG. 10). In this way, the RF tag can be disposed in a position where strain is less likely to be concentrated due to the position of the rubber chafer 51*c*. This reduces the load applied to the RF tag. This can improve the durability of the RF tag.

The RF tag may be disposed sandwiched between, for example, the rubber chafer 51*c* and the carcass 54. In this way, load on the RF tag due to impact or damage applied from the rim can be decreased. Accordingly, the durability of the RF tag can be improved.

The RF tag may be disposed sandwiched between the nylon chafer 51*d* and another member adjacent to the nylon chafer 51*d* outside or inside in the tire width direction C (see reference signs "P13", "P15", and "P21" in FIG. 10). In this way, the position of the RF tag is less likely to change during tire deformation. This reduces the load applied to the RF tag during tire deformation. This can improve the durability of the RF tag.

The nylon chafer 51*d* may, for example, include a portion adjacent to the rubber chafer 51*c*, outside in the tire width direction C. In such a case, the RF tag may be disposed sandwiched between the nylon chafer 51*d* and the rubber chafer 51*c* (see reference sign "P21" in FIG. 10). The nylon chafer 51*d* may, for example, include a portion adjacent to the side rubber 52*a*, outside in the tire width direction C. In such a case, the RF tag may be disposed sandwiched between the nylon chafer 51*d* and the side rubber 52*a* (see reference sign "P13" in FIG. 10).

The nylon chafer 51*d* may, for example, include a portion adjacent to the stiffener 51*b*, inside in the tire width direction C. In such a case, the RF tag may be disposed sandwiched between the nylon chafer 51D and the stiffener 51B. Further, the nylon chafer 51*d* may, for example, include a portion adjacent to the hat rubber 51*f*, inside in the tire width direction C. In such a case, the RF tag may be disposed sandwiched between the nylon chafer 51*d* and the hat rubber 51*f* (see reference sign "P15" in FIG. 10). Further, the nylon chafer 51*d* may, for example, include a portion adjacent to the carcass 54, inside in the tire width direction C. In such a case, the RF tag may be disposed sandwiched between the nylon chafer 51*d* and the carcass 54. Further, the nylon chafer 51*d* may, for example, include a portion adjacent to the wire chafer 51*e*, inside in the tire width direction C. In such a case, the RF tag may be disposed sandwiched between the nylon chafer 51*d* and the wire chafer 51*e*.

In this way, the RF tag may be disposed sandwiched between the nylon chafer 51*d* and another member adjacent to the nylon chafer 51*d* outside or inside in the tire width direction C. In particular, the outer side of the RF tag in the tire width direction C is covered by the nylon chafer 51*d*, which further reduces the load applied to the RF tag due to impact or damage from outside the tire in the tire width direction C. Accordingly, the durability of the RF tag can be further improved.

The RF tag may be disposed sandwiched between the wire chafer 51*e* and another member adjacent to the wire chafer 51*e* inside or outside in the tire width direction C (see reference signs "P20" and "P23" in FIG. 10). In this way, the position of the RF tag is less likely to change during tire deformation. This reduces the load applied to the RF tag during tire deformation. This can improve the durability of the RF tag. The other member adjacent to the wire chafer 51*e* inside or outside in the tire width direction C may be, for example, a rubber member such as the rubber chafer 51*c* (see reference sign "P23" in FIG. 10). The other member adjacent to the wire chafer 51*e* inside or outside in the tire width direction C may be, for example, the carcass 54 (see reference sign "P20" in FIG. 10).

The pneumatic tire according to the present disclosure is not limited to the specific configurations illustrated by the embodiments and variations described above, and various variations, changes, and combinations are possible as long as they do not depart from the scope of the claims.

[Contribution to United Nations-led Sustainable Development Goals (SDGs)]

The SDGs have been proposed with the aim of realizing a sustainable society. An embodiment of the present disclosure may be considered a technology that may contribute to "No. 7—Affordable and Clean Energy", "No. 13—Climate Action", and the like.

INDUSTRIAL APPLICABILITY

The present disclosure relates to a pneumatic tire.

REFERENCE SIGNS LIST

1: substrate
2: flat antenna
2*a*: tip of flat wire antenna as flat antenna
3: outer body
10: communication device
11: IC chip
12: antenna
12*a*: circumferential periphery 13: base material
13a: circumferential periphery
21: electromagnetic field coupling portion
21a: electromagnetic field coupling portion end
22: extension portion
22A: first extension portion
22B: second extension portion
23: straight section
23A: first straight section
23B: second straight section
23C: third straight section
24: turn-back section
24A: first turn-back section
24B: second turn-back section
31: main body
31a: holding surface
31b: side edge
31c: end edge
31d: end edge
31e: back surface
32: lid
32a: facing surface
32c: end edge
32d: end edge
33: substrate holding protrusion
34 antenna holding groove
34a: bottom surface
35: side recess
35a: circumferential periphery
35b: first straight section
35c: curved section
35d: second straight section
36: side end opening
37 substrate holding recess
38 positioning groove
38a: top surface
39: locking recess
40 locking protrusion
50: tire
51: bead portion
51a: bead core
51B, 51B1, 51B2: stiffener
51c: rubber chafer
51d: nylon chafer
51e: wire chafer
51f: hat rubber
52: sidewall portion
52a: side rubber
53: tread portion
53a: tread rubber
53b: cushion rubber
54: carcass
54a: turn-up end
55: belt
55a to 55d: belt plies
56 inner liner
60: tire body
60a: tire cavity
A: thickness direction of flat antenna
B: antenna in-plane direction of flat antenna
C: tire width direction
CL: tire equatorial plane
D1 outer diameter of electromagnetic field coupling portion
E: tire radial direction
F: tire circumferential direction H1: height from bottom surface of antenna holding
  groove to lid
W1: width of antenna holding groove
P1 to P23: positions of communication device

The invention claimed is:

1. A pneumatic tire comprising:
a tire body; and
a communication device embedded in the tire body,
  wherein
the communication device comprises a flat antenna,
the communication device is disposed so that an antenna
  in-plane direction that is perpendicular to the thickness
  direction of the flat antenna is along an outer surface of
  the tire body,
the flat antenna is a flat wire antenna, extending in a
  meandering, wavy-shaped, or zigzag shape along the
  antenna in-plane direction,
the communication device is embedded in a sidewall
  portion of the tire body in one direction along the tire
  radial direction relative to a turn-up end of a carcass,
  and
a tip of the flat wire antenna is not disposed at a position
  corresponding to an end of the flat wire antenna in the
  other direction along the tire radial direction.

2. The pneumatic tire according to claim 1, wherein
the communication device further comprises:
a substrate including an IC chip; and
an outer body configured to hold the flat antenna and the
  substrate on a holding surface, wherein
the communication device is disposed so that the holding
  surface of the outer body faces the side of the outer
  surface of the tire body.

3. The pneumatic tire according to claim 1, wherein
the communication device further comprises:
a substrate including an IC chip; and
an outer body configured to hold the flat antenna and the
  substrate on a holding surface, wherein
the communication device is disposed so that a surface of
  an opposite side to the holding surface of the outer body
  faces the side of the outer surface of the tire body.

4. The pneumatic tire according to claim 1, wherein the tip
of the flat wire antenna terminates facing the one direction
along the tire radial direction.

5. The pneumatic tire according to claim 2, wherein the tip
of the flat wire antenna terminates facing the one direction
along the tire radial direction.

6. The pneumatic tire according to claim 3, wherein the tip
of the flat wire antenna terminates facing the one direction
along the tire radial direction.

* * * * *